United States Patent
Seniawski et al.

(10) Patent No.: US 6,914,354 B2
(45) Date of Patent: Jul. 5, 2005

(54) ASSEMBLY AND METHOD FOR DIRECT COOLING OF MOTOR END-WINDING

(75) Inventors: David Seniawski, Ann Arbor, MI (US); Jason M. Cardinal, Taylor, MI (US); Sayeed Ahmed, Canton, MI (US)

(73) Assignee: Ballard Power Systems Corporation, Dearborn, MI (US)

( * ) Notice: Subject to any disclaimer, the term of this patent is extended or adjusted under 35 U.S.C. 154(b) by 0 days.

(21) Appl. No.: 10/334,820

(22) Filed: Dec. 30, 2002

(65) Prior Publication Data

US 2003/0173840 A1 Sep. 18, 2003

Related U.S. Application Data

(60) Provisional application No. 60/319,081, filed on Jan. 16, 2002.

(51) Int. Cl.[7] .................................................. H02K 9/00
(52) U.S. Cl. .............................. 310/58; 310/52; 310/64; 310/53; 310/56; 310/57; 62/197; 62/505
(58) Field of Search ............................... 310/58, 64, 52, 310/53, 54, 56, 57, 67; 62/197, 505

(56) References Cited

U.S. PATENT DOCUMENTS

| | | | |
|---|---|---|---|
| 3,150,277 A | * | 11/1964 | Chubb .......................... 310/54 |
| 3,645,112 A | * | 2/1972 | Mount .......................... 62/505 |
| 3,749,950 A | * | 7/1973 | Lenz ............................ 310/45 |
| 3,789,249 A | * | 1/1974 | Purman ........................ 310/54 |
| 3,805,101 A | | 4/1974 | Purman ........................ 310/54 |
| 4,464,593 A | | 8/1984 | Kofink ......................... 310/58 |
| 4,565,503 A | | 1/1986 | Wise ........................... 417/372 |
| 4,644,210 A | | 2/1987 | Meisner et al. ............... 310/211 |
| 5,081,382 A | | 1/1992 | Collings et al. .............. 310/54 |
| 5,160,864 A | | 11/1992 | Saito ........................... 310/54 |
| 5,347,188 A | | 9/1994 | Iseman et al. ............ 310/68 D |
| 5,363,002 A | | 11/1994 | Hernden et al. .............. 310/54 |
| 5,372,213 A | | 12/1994 | Hasebe et al. ............. 180/65.6 |
| 5,508,574 A | * | 4/1996 | Vlock .......................... 310/113 |
| 5,532,535 A | | 7/1996 | Oltmanns .................... 310/90 |
| 5,619,956 A | | 4/1997 | Koziara et al. .......... 123/41.31 |
| 5,670,838 A | | 9/1997 | Everton ....................... 310/254 |
| 5,731,643 A | | 3/1998 | Avakian et al. ............... 310/53 |
| 6,072,253 A | | 6/2000 | Harpenau et al. ............. 310/58 |
| 6,087,744 A | | 7/2000 | Glauning ..................... 310/58 |
| 6,201,365 B1 | | 3/2001 | Hara et al. ................... 318/558 |
| 6,515,383 B1 | * | 2/2003 | Ognedbene ................... 310/52 |

* cited by examiner

*Primary Examiner*—Darren Schuberg
*Assistant Examiner*—Iraj Mohandesi
(74) *Attorney, Agent, or Firm*—Seed IP Law Group PLLC

(57) ABSTRACT

Methods and related systems providing removal of heat from electric motors via fluid baths.

17 Claims, 4 Drawing Sheets

ASSEMBLY AND METHOD FOR DIRECT COOLING OF MOTOR END-WINDING

CROSS-REFERENCE TO RELATED APPLICATION

This application claims the benefit under 35 U.S.C. § 119(e) of the U.S. Provisional Patent Application No. 60/319,081 filed 16 Jan. 2002, entitled Assembly And Method For Direct Cooling Of Motor End-Winding, such application hereby incorporated by reference in its entirety.

BACKGROUND OF THE INVENTION

1. Field of the Invention

The present application generally relates to a method and system for use with electric motors.

2. Description of the Related Art

Electric motors are power conversion devices. Electric motors typically convert electrical power into some type of mechanical power.

Electric motors typically have two primary parts: a stator and a rotor. The "stator" is a mechanically non-moving or stationary part of the motor. The rotor is a mechanically moving or rotating part. Typically, the rotor is formed in roughly the shape of a cylinder and is surrounded by the stator, which is also typically roughly shaped as a cylinder.

Electric motors are not one hundred percent efficient as they convert electrical power into mechanical power. Specifically, mechanical friction and electrical resistance tend to create losses generating heat.

Generated heat has numerous deleterious effects. For example, generated heat tends to increase both mechanical friction and electrical resistance within the motor, thereby creating a process which tends to feed on itself and create yet more mechanical friction and electrical resistance, thereby engendering yet more losses. Furthermore, modern power system components (e.g., electronic control and measurement components and motor insulation) tend to degrade more rapidly in the presence of high heat. It is therefore generally recognized that every effort should be made to remove generated heat from electric motors.

There are several conventional methods for removing generated heat from electric motors. One example of such conventional methods is air cooling. Air cooling uses either passive or active techniques to cause the flow of heat from warmer surfaces of components of electric motors to cooler air.

BRIEF SUMMARY OF THE INVENTION

Electric motors typically use windings integral with the stator to generate a rotating electromagnetic field, where the windings are electrically fed from a source external to the stator. Portions of such stator windings have historically tended to protrude from either or both ends of stator cores. Consequently, such protrusions of the stator windings are generally known as electric motor "end-windings." It is desired to remove heat from surfaces proximate to the electric motor end-windings.

The inventors have noted that the thermal resistance of heat paths proximate to electric motor end-windings can advantageously be reduced. Accordingly, the inventors have devised various embodiments of methods and systems that provide, as some of their many advantages, the advantage of reducing the thermal resistance of heat paths proximate to electric motor end-windings and the advantage of providing greater cooling of electric motors.

In one embodiment, a system having an electric motor includes but is not limited to a stator core; a stator winding having a winding portion external to the stator core; and a fluid bath having fluid in contact with the winding portion external to the stator core.

In another embodiment, a motorized vehicle includes but is not limited to an electric motor having a magnetic core; a winding having a winding portion internal to the magnetic core and a winding portion external to the magnetic core; and a fluid bath in contact with the winding portion external to the magnetic core.

In one embodiment, a method of making a system to transfer heat between an electric motor end-winding and a heat sink includes but is not limited to: loading a volume of fluid to a reservoir; and at least partially submerging the end-winding in the volume of fluid.

In another embodiment, a method of transferring heat between an electric motor end-winding and a heat sink includes but is not limited to: maintaining contact between a volume of fluid in a reservoir and the end-winding.

In addition to the foregoing, other method embodiments are described in the claims, drawings, and text forming a part of the present application.

The foregoing is a summary and thus contains, by necessity, simplifications, generalizations and omissions of detail; consequently, those skilled in the art will appreciate that the summary is illustrative only and is NOT intended to be in any way limiting. Other aspects, inventive features, and advantages of the devices and/or processes described herein, as defined solely by the claims, will become apparent in the non-limiting detailed description set forth herein.

BRIEF DESCRIPTION OF THE SEVERAL VIEWS OF THE DRAWINGS

The use of the same reference numbers in different drawings typically indicates similar or identical items.

DETAILED DESCRIPTION OF THE INVENTION

Figure 1:
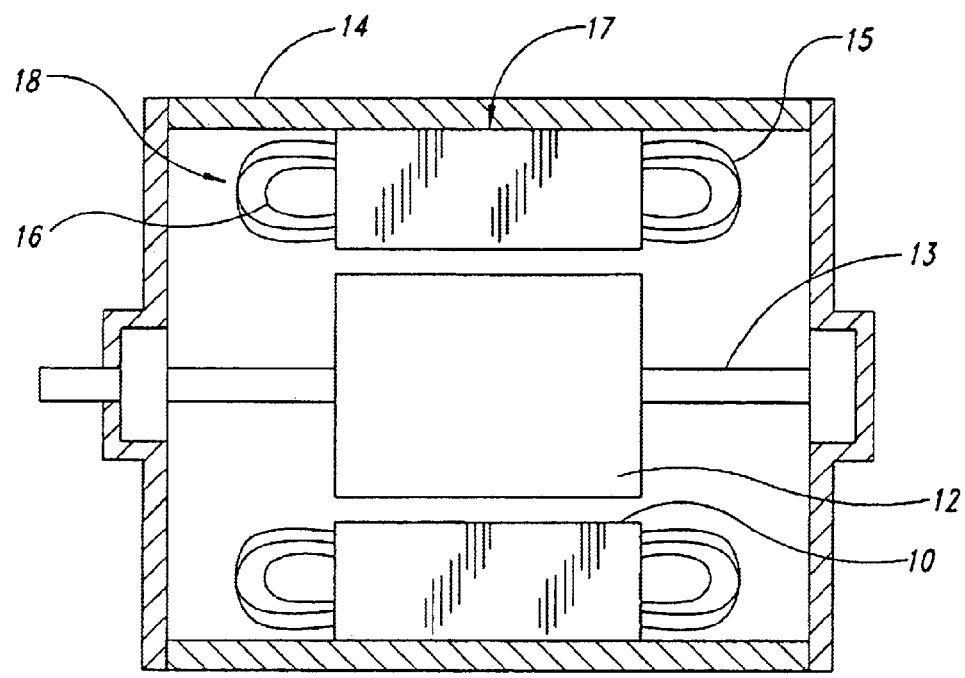
FIG. 1 is a cross-sectional view having a stator which includes an end-winding integral formed with a winding.

FIG. 1 shows a representation of one embodiment of an electric motor. The motor includes a stator core 10 a rotor 12, a shaft 13 of the rotor 12, and a motor housing 14. The housing 14 is sealed to prevent entry of external contaminants into the motor assembly. The stator core 10 has winding 15 formed by winding a wire 16 around a core with a predetermined electrical specification. The wire 16 may have an enameled coating outside which functions as insulation. Passing an electric current through winding 15 from the outside generates an electromagnetic force which rotates the rotor 12. The rotor 12 may, or may not, include fan blades formed or attached onto the end or ends of the rotor 12. The winding 15 consists of intimately wound wire 16 and maybe impregnated with varnish to avoid flexing. The winding 15 is a differentiator between motor designs, and has a great deal to do with the performance of the motor. The winding 15 is inserted into the steel stator core 10. The core includes a watercooled jacket 17 which is wrapped around the stator core 10 outer surface. Watercooled jacket 17 transfers dissipated heat from the winding 15 to fluid in the watercooled jacket 17. The protruding location of the end-windings 18 creates an inefficient cooling path to the watercooled jacket 17, and therefore is sometimes provided with an alternate cooling system.

Conventional passive or active air cooling systems are sometimes used to cool end-windings 18. The inventors have noted that both the passive and active air cooling systems are somewhat ineffective in removing heat from end-windings 18, due at least in part to the fact that such air cooling systems use recirculated air contained within the sealed motor housing 14.

Figure 2:
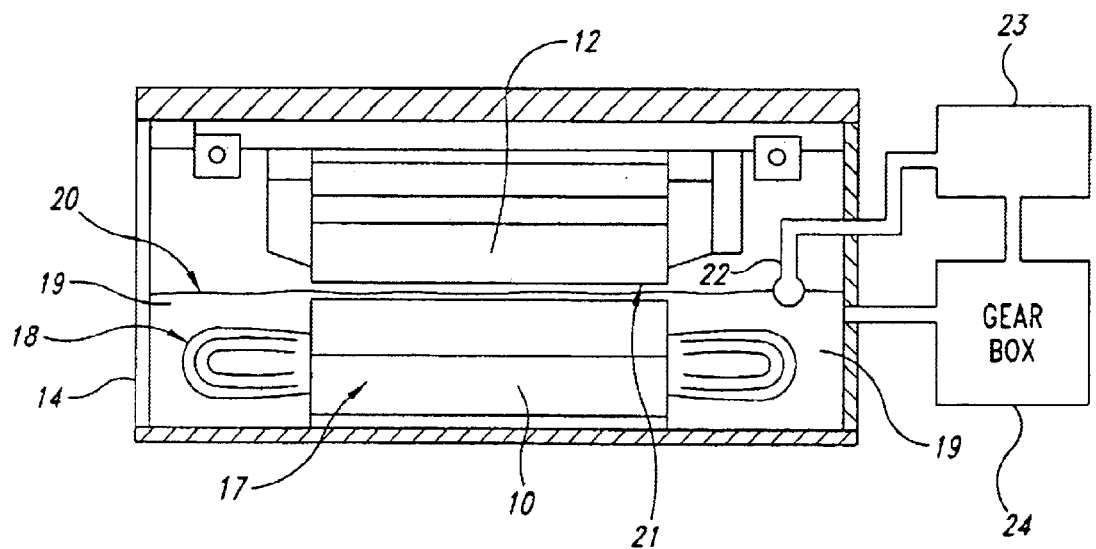
FIG. 2 is a cross-sectional view including a passive fluid bath.

FIG. 2 shows a motor assembly which includes a passive fluid bath 19 in which the end-windings 18 are submerged. In one implementation, the fluid is an oil, such as gear-box oil, which may be circulated from the gear-box to the electric motor. The fluid bath 19 can be characterized as an open reservoir which can reside in a cavity interior to the motor housing. In one implementation, the cavity takes the shape of the motor housing 14. In one embodiment, the top surface of the fluid bath 20 lies just below surface 21 of the rotor assembly 12. The fluid bath 19 is in direct contact with a hot surface of the end-windings 18. In one implementation, sensing circuitry 22 senses the level of the top surface of the fluid bath 20, and a fluid control mechanism 23, responsive to the sensing circuitry, maintains the fluid level such that the top surface of the fluid bath 20 lies just below surface 21 of the rotor assembly 12. In one embodiment the fluid control circuitry maintains the fluid level by pumping oil to and from the gear box 24.

During operation of the motor, and especially during heavy load conditions, heat is generated in the stator windings. In one implementation, the generated heat is removed by both cooling jacket 17 and passive fluid bath 19.

The stator core 10 transfers heat from the windings to the cooling jacket 17. The hanging end-windings 18 are not in direct contact with the stator core 10, but are in direct contact with passive fluid bath 19 and are therefore primarily cooled by passive fluid bath 19. In one embodiment, the passive fluid bath 19 is believed to cause an accelerated convection heat transfer. Accelerated convection heat transfer is the flow of heat from the hot molecules on the surface of the end-windings 18, to the cold molecules of the fluid bath 19. In general, the cooler the fluid bath 19, the greater the heat transfer. Increased dissipated heat transfer tends to allow the electric motor to be operated at higher power levels than it could otherwise tolerate.

As stated above, the watercooled jacket 17, which is wrapped around the stator core outer surface, is designed to accommodate water cooling of the stator core 10. The thermal path from a copper end-winding 18 through the stator core 10 and ultimately to the cooling water, tends to have a high thermal resistance.

Figure 3:
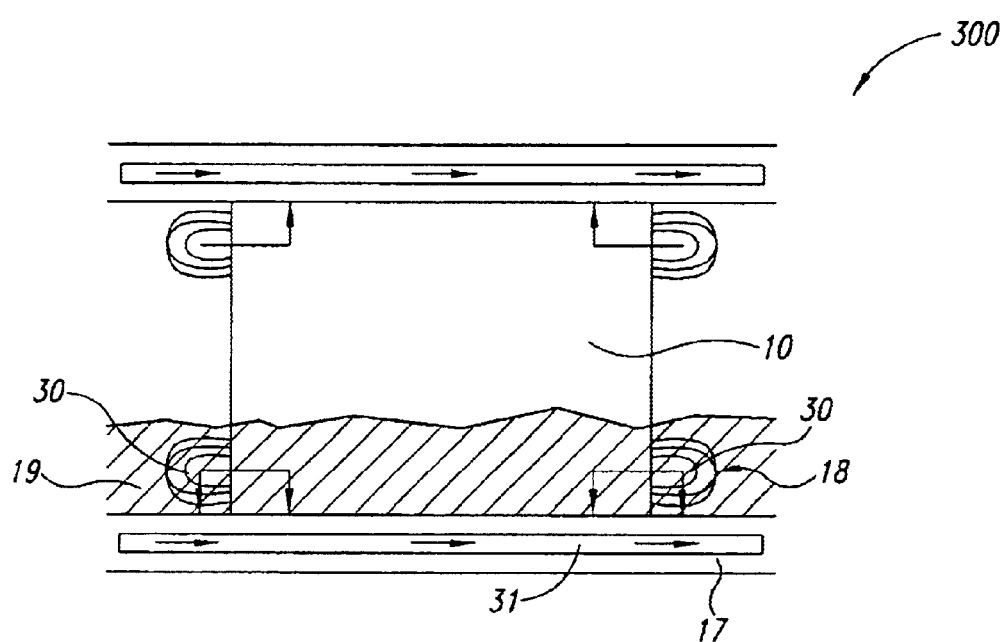
FIG. 3 is a cross-sectional view of a passive fluid bath which provides a heat transfer path from an end-winding to a watercooled jacket.

FIG. 3 shows that in one implementation of an electric motor 300, the fluid bath 19 provides a direct conductive and convective heat transfer path 30 from the end-windings 18 to the watercooled jacket 17 surrounding the stator lamination stack. Fluid, such as water or coolant 31, flows through the watercooled jacket 17 and is used to cool the stator and windings 18. The oil bath 19 is believed to cool the end windings by contacting the watercooled jacket 17 and providing a path of lower thermal resistance. In one implementation, the oil 19 is stirred due to either or both of the rotation of rotor 12 fan blades (not shown) and natural convection. In addition, the fluid bath 19 is believed to add thermal capacitance to the electric motor assembly, which is believed to reduce local temperature fluctuations in the end-windings 18 during transient load conditions. Using the passive fluid bath 19, as opposed to an active-oil cooling strategy, the fluid, such as oil, is not sprayed, and therefore exerts little mechanical pressure which may otherwise erode the end-winding varnish and insulation. As opposed to an active oil cooling strategy, in one implementation the oil itself is not externally cooled or prompt, so the fluid bath 19 assembly may be realized with little extra cost above a standard traction motor.

The layer where the cool fluid from the fluid bath 19 meets the end-winding 18 surface is called the boundary layer. At this region, the boundary layer is very thin, and. hence the heat from the end-winding is transferred very easily. Perfect heat transfer involves breaking the boundary layer completely. In the subject matter of the present application, it is believed that the fluid bath reduces the boundary layer, making it very thin. When the fluid hits the end-winding 18 surface, it is believed that very thin hydrodynamic and thermal boundary layers form in the impact region. Consequently, extremely high heat transfer coefficients are obtained with a stagnation zone. Since the peak heat transfer only occurs within the stagnation zone, the fluid bath 19 provides an effective means where highly localized cooling is desired, such as at the end-winding to 18.

A mathematical formula believed to represent the form of heat transfer of the subject matter of the present application is Newton's Law of Cooling. As applied to the subject matter of the present application, Newton's Law of Cooling states that the rate at which heat is transferred from the end-windings 18 to the passive fluid bath 19 is related to an proportionality constant often donated as: h [W/m$^2$ degrees Kelvin] and called the heat transfer coefficient. Simulation studies were conducted regarding cooling methods. A grading of end-winding cooling efficiency was calculated for stagnant air, convection cooling using a fan, and fluid bath 19 cooling. Stagnant cooling was the least efficient removing only 10 W/m$^2$ degrees Kelvin, convection cooling using a fan with air movement of 5–10 mph was better at 5–100 W/m$^2$ degrees Kelvin, and passive oil bath cooling was the best, removing greater than 100 W/m$^2$ degrees Kelvin. A simulation study was conducted which demonstrated that end-winding 18 temperature cooling efficiency was improved using the passive oil bath 19. The end-winding 18 temperature increase over the main coolant temperature is less for fluid bath 19 cooling, such as oil, as it is for natural convection. cooling and forced air fan cooling. The heat transfer coefficient of fluid bath 19 cooling is much greater than that of natural convection.

A temperature sensor may be located in the end-winding 18. As the temperature approaches an end limit, usually in the range of 150–195 degrees Centigrade, preferably in the range of 150–180 degrees Centigrade, current supply to the motor is constrained. Using the fluid bath 19 assembly, the temperature of end-winding 18 can be lowered to around 150 degrees Centigrade, or less, so that more current may be supplied to the motor. The more current that is supplied to the motor, the more power the motor is able to generate, and the more current the motor is able to generate. Current tends to be directly proportional to torque, and is referred to as power density. The passive fluid bath 19 cooling assembly increases an electric motor's power density.

With natural convection cooling using stagnant air, as the air around the surface of the end windings 18 approaches and equals the temperature of the end-windings 18 themselves, heat is no longer able to be transferred from the end-windings 18 to the surrounding air because the temperatures are equal. Heat will tend to transfer through a path of minimum thermal resistance, hot to cold, and is unlikely to travel on a path to an equal temperature.

Figure 4:
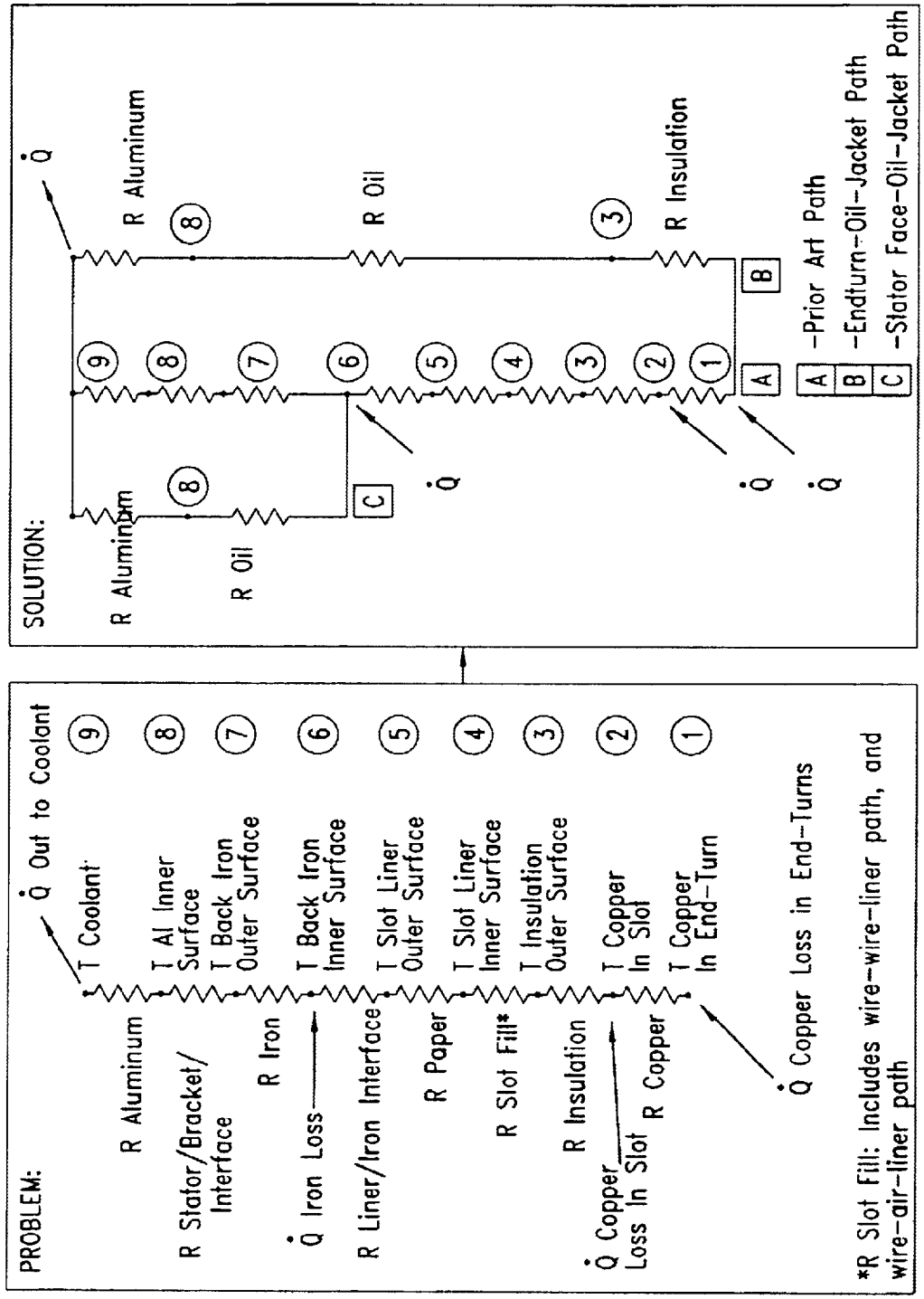
FIG. 4 is a functional block diagram illustrating the problem of a high thermal resistance between the windings, stator iron, and water cooling jacket, and the solution of a path of lower thermal resistance provided in one embodiment of the subject matter of the present application.

FIG. 4 shows that, in one embodiment, the fluid bath 19 provides a thermal path with a lower thermal resistance as compared to conventional end-winding 18 cooling methods. The fluid bath 19 assembly is believed to result in lower temperatures of the end-windings 18 of an electric motor, which results in increased motor reliability. As end-winding 18 temperatures rise above a certain level, around 150–195 degrees Centigrade, the performance and reliability of electric motors and generators are constrained. Lower end-winding 18 temperatures translate into higher motor performance, higher power density, and improved reliability of the motor. For a given motor power rating, any motor with the cooling methods of the subject matter described herein may be significantly smaller in size, lower in weight, and cost less than a motor with a conventional cooling method.

Since the field strength of a permanent magnet is proportional to temperature, cooling the end-windings 18, and in effect the permanent magnet, increases the field strength, which produces higher voltage in the stator. The reduction of heat radiating from the stator core 10 causes a reduction in the temperature of the end-windings 18, which lowers the resistance of the windings 18. This higher voltage and lower resistance reduces the current for a given kilowatt output or load. Since the efficiency and life of many power electronics are inversely proportional to current, the fluid bath cooling assembly and method will therefore increase the efficiency of the electric motor system as a whole, and increase the life of the magnet, stator windings 18, power electronics, and other components. Cooling the stator windings 18 to a lower operating temperature improves the reliability and robustness of electric motor system by increasing the operating margin of the system as,a whole, and is particularly important at higher ambient temperatures.

The fluid bath 19 cooling assembly does not interfere with the primary function of the electric motor. The rotor 12, and all other components of the electric motor assembly, function as intended. The fluid bath 19 assembly design does not block or prevent the cooling of the rotor 12.

Assemblies, systems, and methods for the cooling of electric motor end-windings 18 utilizing a passive fluid bath 19 have been described herein. In a general sense, those skilled in the art will recognize that the various embodiments described herein which can be implemented, individually and/or collectively, by a wide range of hardware.

Those skilled in the art will recognize that it is common within the art to describe devices and/or processes in the fashion set forth herein, and thereafter use standard engineering practices to integrate such described devices and/or processes into systems. That is, the devices and/or processes described herein can be integrated into systems via a reasonable amount of experimentation.

Figure 5:
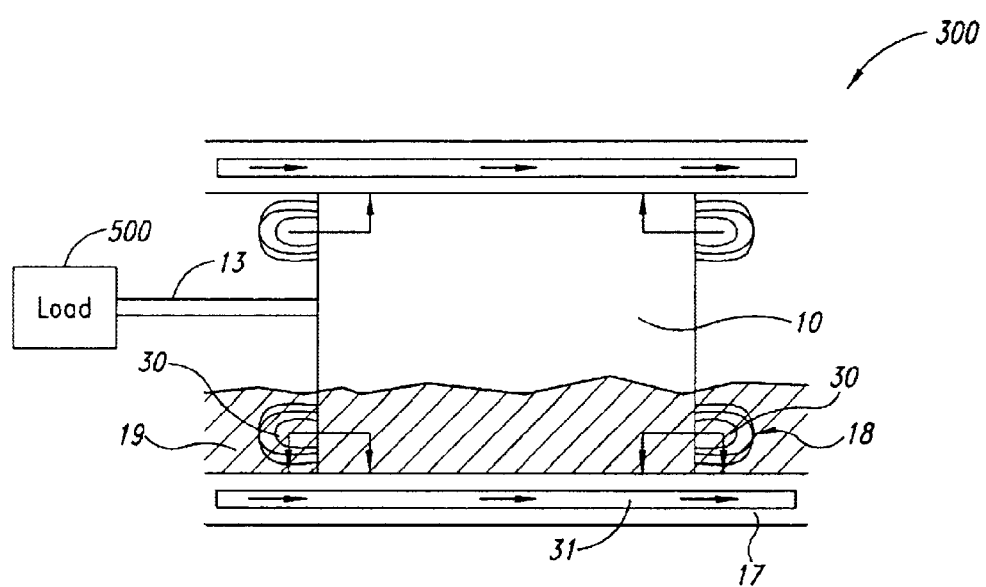
FIG. 5 is a cross-sectional view of an electric motor having cooling described herein with a coupling device and a mechanical load.

FIG. 5 shows one such contemplated integration. The shaft 13 of electric motor 300 is coupled via conventional techniques to load 500. Those skilled in the art will recognize that conventional coupling techniques include but are not limited to mechanical techniques such as gear assemblies and hydraulic assemblies. Those skilled in the art will also recognize that load 500 can be virtually anything that can be driven, in part or in whole, by an electric motor, such as a vehicle (e.g., an electric vehicle, a hybrid-electric vehicle, a fuel-cell powered vehicle, etc.), an aircraft, a watercraft, an electrical appliance (e.g., a computer system, washing machine, an air conditioning system, etc.), or any other device that can be driven in part or in whole by an electric motor.

All of the above U.S. patents, U.S. patent application publications, U.S. patent applications, foreign patents, foreign patent applications and non-patent publications referred: to in this specification and/or listed in the Application Data Sheet, are incorporated herein by reference, in their entirety, including but not limited to U.S. Ser. No. 60/319,081, entitled Assembly And Method For Direct Cooling Of Motor End-Winding, filed 16 Jan. 2002.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

What is claimed is:

1. A system having an electric motor, the system comprising:
   a motor housing having an internal reservoir;
   a rotor;
   a stator core having a stator winding, a portion of the stator winding protruding from at least one side of the stator core;
   a fluid bath in the reservoir of the motor housing, the fluid bath having a top surface, wherein the rotor is maintained out of contact with the fluid bath;
   a fluid level sensor for sensing a level of the top surface of the fluid bath; and
   a controller coupled with the fluid level sensor to receive signals indicating the level of the top surface of the fluid bath, the controller operable to control a rate of the fluid circulating through the reservoir and the controller configured to maintain the level of the top surface as a fluid-gas interface spaced above the protruding portion of the stator winding.

2. The system of claim 1 wherein the fluid is oil.

3. The system of claim 1 wherein the fluid is recirculated gear-box oil.

4. The system of claim 1 wherein the electric motor is coupled with a load.

5. The system of claim 1 wherein the motor housing further comprises:
   a heat sink.

6. The system of claim 5, further comprising:
   a fluid cooled jacket encompassing the stator core.

7. The system of claim 1, further comprising:
   means for routinely exchanging the fluid within the reservoir to adjustably maintain a temperature difference between the fluid bath and the protruding portion of the stator winding.

8. The system of claim 1, further comprising:
   means for routinely exchanging the fluid within the reservoir to encourage convective heat transfer between the protruding portion of the stator winding and the fluid bath.

9. The system of claim 1 wherein the controller is operable to control a rate of the fluid into the reservoir.

10. The system of claim 1 wherein the fluid comprising the fluid bath is not externally cooled during operation of the electric motor.

11. A motorized vehicle comprising:
    an electric motor having a rotor and a magnetic core;
    a winding having a winding portion internal to the magnetic core and a winding portion external to the magnetic core;
    a fluid bath in contact with at least the winding portion external to the magnetic core, wherein a top surface of the fluid bath forms an interface between the fluid bath and a gas, the fluid comprising the fluid bath is maintained out of contact with the rotor;
    a fluid level sensor for sensing a level of the top surface of the fluid bath; and
    a controller coupled with the fluid level sensor to control a rate of the fluid circulating through the reservoir and to maintain the level of the top surface above the winding portion external to the magnetic core while insuring a gap that extends above the top surface to a portion of the rotor.

12. The motorized vehicle of claim 11 wherein the motorized vehicle is an electric vehicle, a hybrid-electric vehicle, or a fuel-cell powered vehicle.

13. The motorized vehicle of claim 11, wherein the winding portion external to the magnetic core is an end-winding of a stator.

14. A method of transferring heat from at least an external end-winding of a stator core, the stator core operating in conjunction with a rotor to form an electric motor, the motor having an internal reservoir, the stator core having an internal winding electrically coupled with the external end-winding, said method comprising:
    sensing a top surface fluid level of a volume of fluid located in the reservoir;
    controlling a circulation of the fluid; and
    maintaining the top surface fluid level to provide a fluid-gas interface spaced above the external end-winding, and wherein maintaining the top surface fluid level includes the fluid comprising the fluid bath being maintained out of contact with the rotor.

15. The method of claim 14 wherein controlling the circulation of the fluid through the reservoir includes circulating the fluid between the reservoir and a gear box.

16. The method of claim 14 wherein maintaining the top surface fluid level to provide the fluid-gas interface includes maintaining a gap that extends above the top surface to a portion of the rotor.

17. The method of claim 14 wherein receiving the fluid in the reservoir through one entry port includes receiving non-recirculated fluid.

* * * * *